Figure 1:
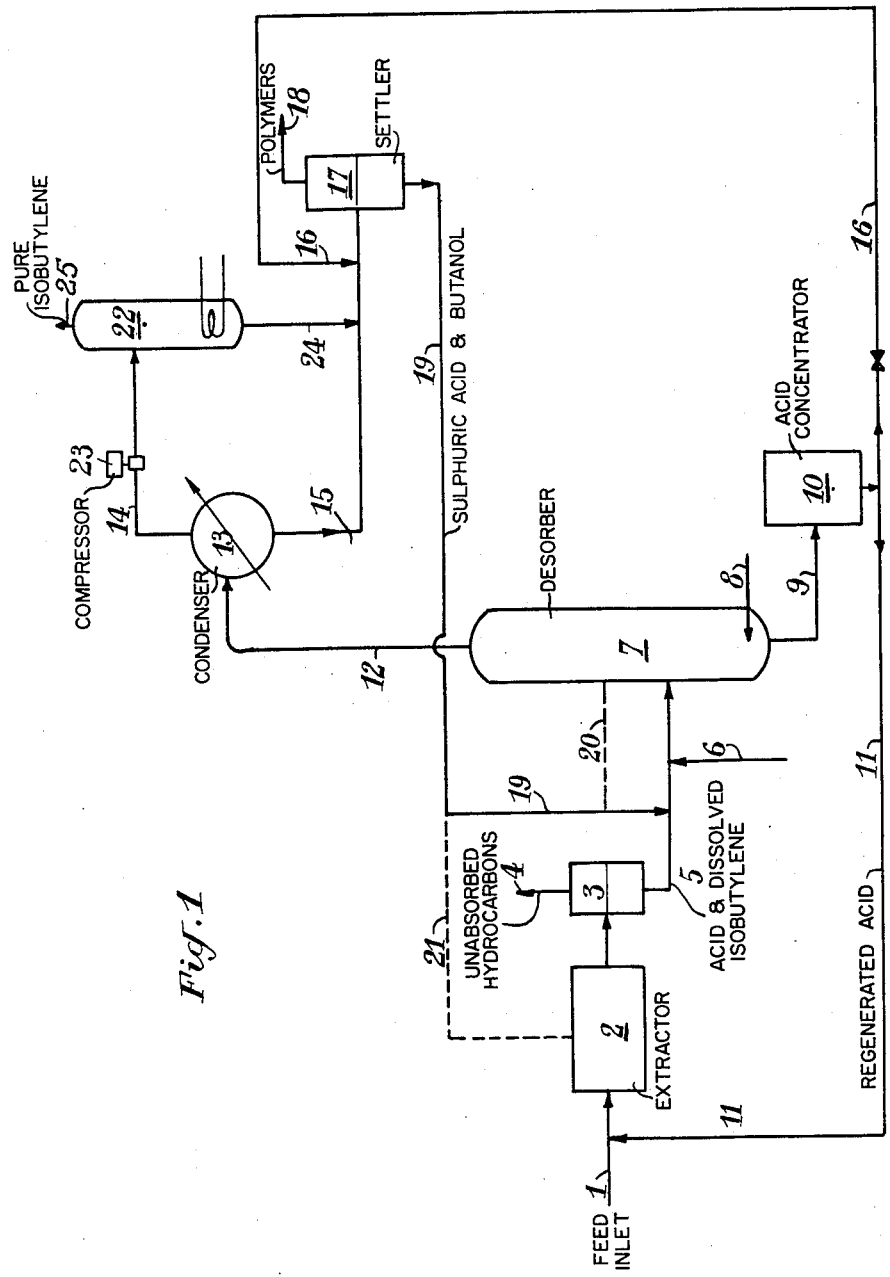

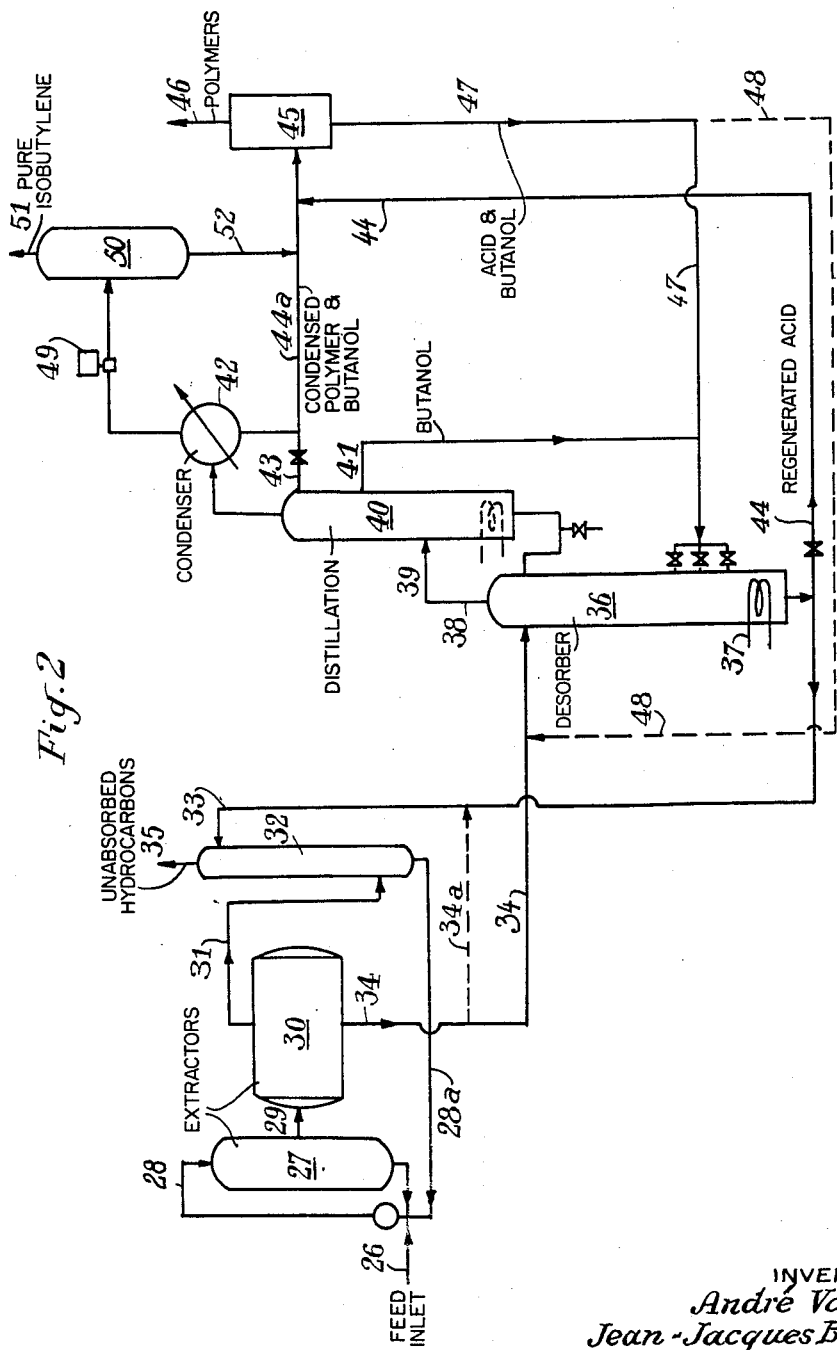

3,073,874
METHOD OF SEPARATION OF ISOBUTYLENE FROM MIXTURES OF HYDROCARBONS

André Valet, Gonfreville-l'Orcher, and Jean J. Bellec, Le Havre, France, assignors to Société Anonyme dite: Compagnie Française de Raffinage, Paris, France, a corporation of France
Filed Mar. 25, 1959, Ser. No. 801,783
Claims priority, application France Mar. 27, 1958
3 Claims. (Cl. 260—677)

It is known that isobutylene may be separated from mixtures of hydrocarbons and in particular from intimate mixtures of petroleum products containing hydrocarbons of $C_4$ by selective extraction with solutions of moderately concentrated sulphuric acid. By the distillation of sulphuric extracts carried out according to various methods with or without preliminary dilution so as to lower the content of the acid solution, pure isobutylene and tertiary butyl alcohol are obtained, and this is re-cycled either in the device for the absorption of isobutylene or at the outlet of this latter in the distillation column, mixed with the acid extract. The application of these various methods however, does not avoid the formation of more or less substantial quantities of polymers of isobutylene and more especially of di-isobutylene.

In current practice, these polymers are collected on distillation with tertiary butyl alcohol and are re-cycled with this latter. If they are returned to the absorption device, they are then extracted in the non-absorbed hydrocarbons, in this case the butanes, isobutanes and n-butenes and these latter require to be redistilled in order to make them suitable for further applications, particularly in the form of liquified combustible gases for domestic use. If they are re-cycled in a mixture with the acid extract, they accumulate in the distillation column and increase the pollution of the sulphuric acid by the formation of carbon deposits.

In order to overcome these drawbacks, the alcohol mixtures drawn off may be diluted with water, but a study of the triangular equilibrium or graph of equilibrium of tertiary butanol-water-di-isobutylene and of the curve or line separating the complete solubility zone of the components from the zone of separation of the two aqueous and hydrocarbon phases shows that these physico-chemical data are not favorable for the separation of pure di-isobutylene; substantial dilutions are made necessary, which increase the cost of subsequent re-distillations.

The applicant has found that there was a special advantage obtained, when separating the isobutylene polymers from a mixture containing the polymers in addition to tertiary butanol and water, by the dilution of this mixture with a medium concentration of sulphuric acid; this is a very efficient method of producing the decantation of the polymer, practically free from tertiary butanol. The following examples (Table I) show the composition of the layers which are separated by the addition of a 50% sulphuric acid solution to different ternary mixtures of tertiary butanol-water-di-isobutylene, as a function of the relative quantity of ternary mixture and acid.

Table I

| | Mixture 1 | | Mixture 2 | | Mixture 3 | |
|---|---|---|---|---|---|---|
| Composition of the mixtures: | | | | | | |
| Percent by weight of polymers | 10 | | 27 | | 40 | |
| Percent by weight of tertiary butanol | 60 | | 59 | | 51 | |
| Percent by weight of water | 30 | | 14 | | 9 | |
| Density at 20° C | 0.852 | | 0.795 | | 0.780 | |
| | $D_{20}°$ of the phases | | $D_{20}°$ of the phases | | $D_{20}°$ of the phases | |
| | upper | lower | upper | lower | upper | lower |
| Vol. ternary mixture/Vol. 50% sulphuric acid: | | | | | | |
| 100:1 | 0.852 | | 0.795 | | 0.780 | |
| 30:1 | | | 0.829 | | | |
| 13.3:1 | | | | | 0.765 | 0.870 |
| 10.5:1 | | | 0.848 | | | |
| 8.9:1 | 0.908 | | | | | |
| 8:1 | | | 0.749 | 0.900 | 0.745 | 0.910 |
| 5:1 | | | 0.740 | 0.950 | | |
| 2.3:1 | 0.732 | 1.038 | (*) | | | |
| 2:1 | | | 0.723 | 1.086 | 0.723 | 1.090 |
| 1:1 | 0.724 | 1.147 | 0.723 | 1.176 | | |
| 1:2 | | | 0.723 | 1.258 | | |
| 1:4 | | | 0.723 | 1.316 | | |
| 1:9 | | | 0.723 | 1.357 | | |

*Polymers: Density at 20° C.=0.723.

The considerable improvment with respect to one dilution with water is shown by the following comparison (Table II):

Table II

| | | | |
|---|---|---|---|
| Initial mixture: | | | |
| tertiary butanol percent by weight | 51 | | 51 |
| di-isobutylene do | 40 | | 40 |
| water do | 9 | | 9 |
| Dilution: | | | |
| vol. mixture/vol. $H_2O$ | 2/1 | | |
| vol. mixture/vol. $H_2SO_4$, 50% | | | 2/1 |

| | Lower phase | Upper phase | Lower phase | Upper phase |
|---|---|---|---|---|
| Decantation: | | | | |
| Ratio of phases percent by weight | 55 | 45 | 79 | 21 |
| Density (20° C.) | 0.960 | 0.757 | 1.090 | 0.723 |
| Composition: | | | | |
| tertiary butanol percent by weight | 22.5 | 41 | 34 | |
| di-isobutylene do | | 53 | | 100 |
| water do | 77.5 | 6 | | |
| water+$H_2SO_4$ do | | | 66 | |

In accordance with the present invention, the preparation of pure isobutylene starting from a mixture of hydrocarbons is carried into effect in the following manner, reference being made to FIG. 1 in the accompanying drawings.

A mixture of hydrocarbons containing isobutylene is charged at 1 and mixed with a sulphuric solution of medium concentration, for example 45 to 65%, in accordance with any known method, in a contact and extraction device 2.

At the outlet of the extractor, a decantation is carried out at 3, and this separates at 4 the hydrocarbons which have not reacted, and the sulphuric extract drawn-off through the conduit 5. This sulphuric extract is distilled in a column 7 after its acid content has been brought down to about 40%, either by dilution with water at 6 or by injection of steam at 8. The diluted acid collected at 9 at the base of the column 7 is concentrated at 10 by any known means and returned at its proper concentration to the extraction device 2 through the conduit 11. The vapors passing out of the column 7 as at 12 are composed of isobutylene, water, tertiary butanol and di-isobutylene, in quantities which vary in accordance with the conditions of extraction and of distillation. These vapors are conveyed through the conduit 12 into the condenser 13 which separates the isobutylene through the conduit 14, and the condensable products through the conduit 15. These condensable products from conduit 15 are mixed, in the proportions of 2:1 to 1:2, with an aliquot part of the acid drawn-off at the outlet of the concentrator 10 through the conduit 16.

The mixtures is conveyed into a decanter or settler 17 which permits of the separation of the di-isobutylene at a very high concentration at 18, and a sulphuric acid solution of tertiary butanol, which is returned through 19 so as to be mixed with the acid extract, or subsequently through 20 at a suitable level of the distillation column 7 or alternatively through 21 to the extraction device 2.

If desired, and in order to free the isobutylene issuing from the condenser 13 from all traces of impurity, it may be liquified by a conventional compressor indicated at 23 and rectified in a column 22, the rectification residue being returned through the conduit 24 to the decanter 17. Pure isobutylene issues from the device 25.

A further example of the application of the method is illustrated in FIG. 2.

A liquid mxture of butanes, n-butene and isobutylene obtained from a fraction of distillation of petroleum products or porducts of any source shown at 26, is intimately mixed—at a temperature which is lower or equal to 45° C.—in a reactor 27 with a solution of sulphuric acid having an acid concentration of the order of 50% by weight and always less than 55% by weight, introduced in continuous manner at 28 and already containing a small percentage by weight of absorbed isobutylene.

The mixture of acid extract and hydrocarbons is conveyed through 29 into the decanter 30. At 31, the upper layer of hydrocarbons is extracted, still containing a small quantity of isobutylene not previously extracted by the acid solution, and this layer is then introduced at the base of an extraction column 32 in which the said hydrocarbons are put into contact, at ambient temperature and in counter-current flow, with a solution of sulphuric acid having an acid concentration of about 50% and always less than 55%, which is introduced at 33 at the head of the column 32 and to which was also previously added at 34a a small quantity of acid extract drawn-off at 34 from the decanter 30, so as to introduce about 3 to 5% of tertiary butanol into the acid entering the column 32 at 33.

The acid solution, having extracted the last quantities of isobutylene contained in the mixture of hydrocarbons, is drawn off at 28a and conveyed into the reactor 27, where it is put into contact with a fresh charge of hydrocarbons containing isobutylene in recoverable quantity. The hydrocarbons which have not reacted are evacuated at 35.

The acid-hydrocarbon ratios, the times of contact in the reactor and other variable factors are controlled in such manner that the acid extracts of tertiary butanol or of the corresponding sulphuric ester have a molecular ratio $$\frac{\text{Absorbed hydrocarbon}}{\text{Sulphuric acid}}$$

of the order of 0.3 to 1 and preferably 0.6 to 0.9.

This extract which is separated in the decanter 30 is drawn-off at 34 and is conveyed, after being expanded to atmospheric pressure, to the upper portion of a distillation column 36 heated at its base by a heating coil 37. The alcohol vapors distilled at 38 are introduced at 39 into the central portion of a rectification column 40. In the upper portion of the column, an azeotropic mixture of tertiary butanol and water, or a mixture having a similar composition, is drawn-off at a few trays below the head, at 41; this mixture is brought down to the central or lower portion of the column 36, where the tertiary butanol is de-hydrated to reform isobutylene. At the head of the column the vapors consisting of isobutylene, tertiary butanol, water and di-isobutylene, are cooled in the condenser 42. The condensate is composed of a mixture of tertiary butanol (51%), di-isobutylene (40%) and water (9%) for a small proportion which is sent back by reflux into the column at 43, whilst the greater proportion drawn-off at 44a is mixed with an aliquot part of 50% acid drawn-off at the base of the column 36 through the conduit 44, in the ratio of 2 volumes of condensate to 1 volume of acid solution. In the case in which the respective proportions of tertiary butanol, isobutylene and water are such that a decantation takes place naturally, only the upper layer which is enriched in polymers will be mixed with the acid, whereas the lower layer will, for example, be returned to the head of the rectification column 40, or alternatively into the distillation column 36.

The mixture of sulphuric acid, tertiary butanol, polymers and water is conveyed into a decanter 45, from the upper layer 46 of which is withdrawn the entire quantity of practically pure di-isobutylene, and from the lower layer a 50% solution of sulphuric acid containing 46% of tertiary butanol and free from di-isobutylene; this solution is brought back through the conduit 47 into the central or lower portion of the column 36; it may also be brought back through 48 to the head of the column 36 mixed with the sulphuric extract passing out of the absorption device.

The isobutylene separated at the condenser 42 is liquified as by a compressor indicated at 49 and conveyed into a rectification column 50 producing at 51 pure isobutylene and at 52 a residue of alcohol, di-isobutylene and water which is returned to the decanter 45 with the condensate from 42 or which may also be returned in reflux to the rectification column 40.

The isobutylene extracted at 51 is over 99.5% pure.

What we claim is:

1. In a method for the separation and removal of isobutylene polymers formed in an isobutylene extraction system in which isobutylene is extracted from a mixture of hydrocarbons by sulfuric acid to produce an extraction mixture including isobutylene and tertiary butanol and said sulfuric acid along with said polymers, the steps which comprise separating said extraction mixture by distillation into sulfuric acid and a distillate phase including all other said components of said mixture, thereafter recovering substantially pure isobutylene from said distillate phase by condensation and rectification leaving a residual condensed mixture including tertiary butanol and said polymers, thereafter washing said condensed mixture with a portion only of said sulfuric acid separated from said extraction mixture in said distillation step to form an aqueous phase including sulfuric acid plus tertiary butanol and a hydrocarbon phase including said polymers, decanting and separating said polymers from said aqueous phase, and re-cycling said aqueous phase mixture of sulfuric acid and tertiary butanol into said distillation step for regenerating further portions of isobutylene.

2. A method as recited in claim 1 in which the ratio between said residual condensed mixture and said portion of sulfuric acid in said washing step is within the range of about 2:1 to 1:2.

3. A method as recited in claim 2 in which said ratio is about 1:1.

References Cited in the file of this patent

UNITED STATES PATENTS

| | | |
|---|---|---|
| 2,281,911 | Bannon et al. | May 5, 1942 |
| 2,388,971 | Hibshman et al. | Nov. 13, 1945 |
| 2,428,668 | Hibshman et al. | Oct. 7, 1947 |
| 2,431,005 | Willauer et al. | Nov. 18, 1947 |
| 2,509,885 | Rupp et al. | May 30, 1950 |

UNITED STATES PATENT OFFICE
CERTIFICATE OF CORRECTION

Patent No. 3,073,874 January 15, 1963

André Valet et al.

It is hereby certified that error appears in the above numbered patent requiring correction and that the said Letters Patent should read as corrected below.

In the grant (only), line 13, for "Société Anonyme dite: Compagnie Prançaise de Raffinage" read -- Société Anonyme dite: Compagnie Française de Raffinage --.

Signed and sealed this 3rd day of December 1963.

(SEAL)
Attest:

ERNEST W. SWIDER
Attesting Officer

EDWIN L. REYNOLDS

Acting Commissioner of Patents